Sept. 23, 1969    H. R. NILSSON    3,468,294
ROTARY INTERNAL COMBUSTION ENGINE
Original Filed Nov. 30, 1966    11 Sheets-Sheet 1

INVENTOR
Hans Robert Nilsson

BY    *Greer Maréchal Jr*

ATTORNEY

Sept. 23, 1969        H. R. NILSSON         3,468,294
           ROTARY INTERNAL COMBUSTION ENGINE
Original Filed Nov. 30, 1966            11 Sheets-Sheet 3

INVENTOR

Hans Robert Nilsson

BY Greer Maréchal Jr.

ATTORNEY

Sept. 23, 1969   H. R. NILSSON   3,468,294
ROTARY INTERNAL COMBUSTION ENGINE
Original Filed Nov. 30, 1966   11 Sheets-Sheet 4

INVENTOR
Hans Robert Nilsson

BY Greer Marechal Jr.

ATTORNEY

Sept. 23, 1969     H. R. NILSSON     3,468,294
ROTARY INTERNAL COMBUSTION ENGINE
Original Filed Nov. 30, 1966     11 Sheets-Sheet 5

INVENTOR
Hans Robert Nilsson

BY *Juee Maréchal Jr.*

ATTORNEY

INVENTOR
Hans Robert Nilsson

Sept. 23, 1969     H. R. NILSSON     3,468,294
ROTARY INTERNAL COMBUSTION ENGINE
Original Filed Nov. 30, 1966     11 Sheets-Sheet 10

INVENTOR

Hans Robert Nilsson

BY *Jreee Marechal Jr.*

ATTORNEY

Sept. 23, 1969  H. R. NILSSON  3,468,294
ROTARY INTERNAL COMBUSTION ENGINE
Original Filed Nov. 30, 1966  11 Sheets-Sheet 11

INVENTOR
Hans Robert Nilsson

BY *Greer Maréchal Jr.*

ATTORNEY

United States Patent Office 3,468,294
Patented Sept. 23, 1969

3,468,294
ROTARY INTERNAL COMBUSTION ENGINE
Hans Robert Nilsson, Extorp, Sweden, assignor to Svenska Rotor Maskiner Aktiebolag, Nacka, Sweden, a corporation of Sweden
Continuation of application Ser. No. 597,900, Nov. 30, 1966. This application June 12, 1968, Ser. No. 739,899
Claims priority, application Great Britain, Dec. 6, 1965, 51,573/65; May 9, 1966, 20,447/66
Int. Cl. F02b 53/00; F01c 1/26
U.S. Cl. 123—12        37 Claims

ABSTRACT OF THE DISCLOSURE

A rotary internal combustion engine comprising a housing providing a working space composed of two intersecting bores, two intermeshing rotors of dissimilar profile, each mounted in one of said bores, and means for supply of a combustible mixture or constituents thereof to and for exhaust of the combusted remains of the mixture from said working space, said rotors being shaped to provide together with the housing, periodically and sequentially, two separate sealed inlet chambers, subsequently brought together to form a single and sealed operation chamber, which first continuously diminishes in volume, thereafter continuously increases in volume and finally diverges into two separate outlet chambers.

---

Figure 1:
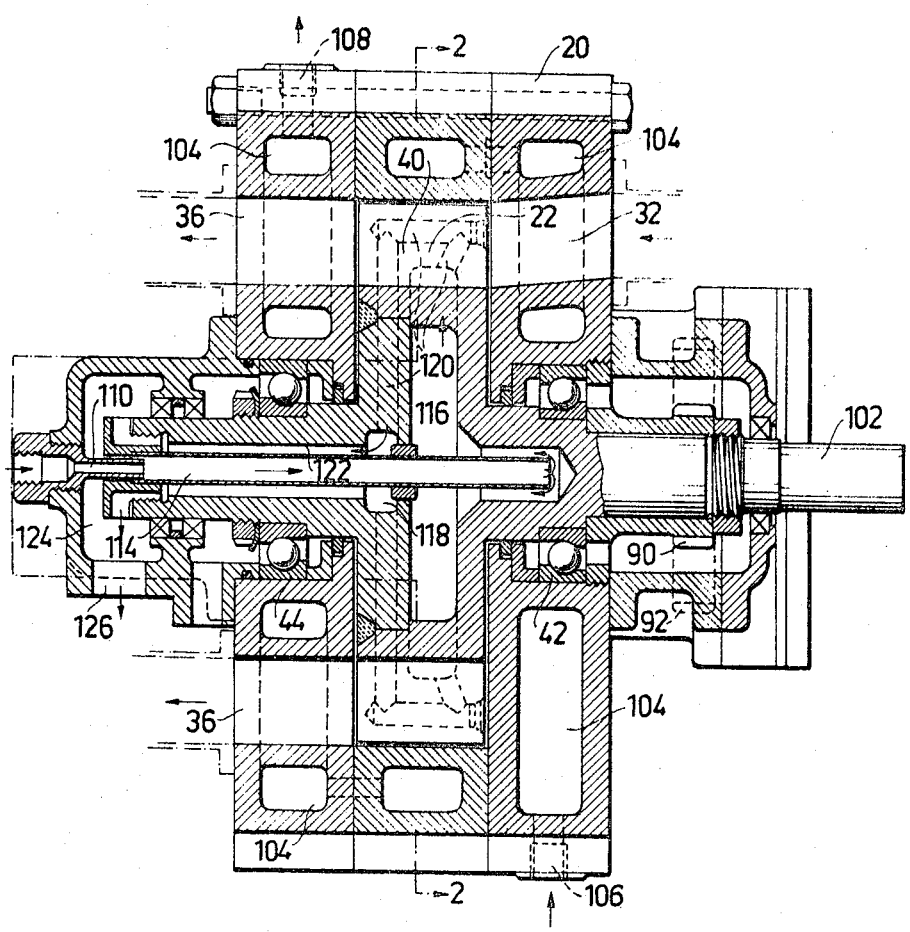

This application is a continuation of Ser. No. 597,900, filed Nov. 30, 1966.

This invention relates to rotary internal combustion engines of the positive displacement type and has particular reference to an engine comprising intermeshing grooved rotors rotatable in a housing structure to provide the required combustion chambers and the necessary sequence of steps or phases of operation required to provide an operative power producing internal combustion cycle.

Hitherto, substantially all practically commercial or feasible positive displacement internal combustion engines have been and are of the reciprocating piston type requiring either two or four piston strokes for the completion of a cycle of operation necessary to produce one power impulse acting on any one piston. Thus, from any engine of such type, the maximum power output that can be expected is that which can be derived from one power impulse per piston for one revolution of the crank shaft or equivalent element causing the reciprocation of the piston, and this maximum rate of power production, in terms of engine shaft revolutions, is obtainable only through the use of the two stroke cycle, which unless aided by forced scavenging, is ordinarily so much less efficient than the four stroke cycle, that the latter is the predominant form of engine in use today, even though it is productive of only one power impulse for a piston for each two revolutions of the engine shaft producing the reciprocation.

On the other hand, rotary positive displacement engines, particularly of the kind embodying two or more intermeshing rotors which either directly or indirectly provide combustion chambers for the internal combustion of fuel to produce power, offer many theoretically possible designs, wherein, through the utilization of not more than a single pair of intermeshing rotors or rotary pistons, several power impulses are obtainable for each revolution of a rotor or other power shaft equivalent to the crank shaft of a reciprocating piston engine. This theoretical possibility opens the door to the production of rotary positive displacement engines greatly superior to the reciprocating piston type in so far as matters of size, weight, cost and like factors, in relation to the power output obtained, are concerned, and the history of the art is replete with a very large number of suggested designs of a wide variety of types designed to take advantage of and secure the obvious theoretical advantages of the rotary piston over the reciprocating piston kind of engine, particularly, in those areas of power output versus units of size, weight and costs.

It is further to be noted that as compared with a multi-cylinder reciprocating engine having a comparable number of power impulses per engine revolution, the number of shaft and other bearings and the surface areas in relatively moving friction contact in the reciprocating engine are many times greater than in an engine embodying the principles of the present invention and for that reason an engine embodying the present invention, even if having no better thermal efficiency than the reciprocating type, will be competitively superior not only because of the reasons heretofore referred to but also because of its much lower losses in so-called "friction horsepower."

However, in spite of the attractive theoretical potentiality of the rotary piston engine as compared with the reciprocating piston engines, and of the many attempts that have been made to capitalize upon them with rotary piston engines of many different types and kinds, it is nevertheless a fact that, at the present time, no such engine, capable of producing more power impulses per piston per shaft revolution of the engine than does the reciprocating piston two-stroke cycle engine, has been produced in commercially practical form to the extent of having any impact whatsoever upon the design, manufacture or marketing of internal combustion engines, or of even being known to have been successfully produced even upon a prototype basis.

Accordingly, it is the general object of this invention to provide a new and improved form of positive displacement internal combustion rotary engine of practical and simple design capable of relatively inexpensive manufacture, having relatively few moving parts, which can be readily and practically cooled and lubricated by known conventional methods, in which the parts, moving or otherwise, subject to wear will be relatively few and of rugged construction and readily renewable either in whole or in part or adjustable to compensate for wear and in which none of the parts will be subject to excessive or rapid wear, which will be equally adaptable for operation either in accordance with the Otto or the Diesel cycle of operation, which will be readily adapted for variable speed and variable load operation as well as for constant speed and constant load operation, in which the controls for effecting variable power output at different speeds will be simple and without the substantial impairment to the efficiency of operation of the engine, which is well adapted to use conventional and proven types of ignition systems, both electrical and thermal as well as other and novel ignition and ignition timing means hereinafter referred to, with which known methods for supplying combustion air or combustible gaseous mixtures either at normal aspirated or supercharged pressures may be employed, with which known system for solid injection of fuel may readily be employed and which, in so far as thermal efficiency and consequent rate of fuel consumption are concerned, will be competitively comparable with if not superior to existing reciprocating piston engines.

With the several facets of the foregoing general object, and numerous other and more specific objects hereinafter appearing, in view, the invention contemplates, an engine comprising a pair of intermeshing rotors of dissimilar profile consisting of a primary or piston rotor and a secondary or chamber rotor, both to be more fully described hereinafter, both rotors being provided with lands and intervening grooves having axiallly extending flanks, the minimum number of which on each rotor is three and which for the primary rotor is preferably at least four with a different and usually greater number for the secondary rotor, between the lands and cooperating grooves of which when in fully meshed position closed combustion chambers are formed in which a fully compressed combustible charge, compressed in the cooperating grooves of the rotors as fully meshed position is approached, is ignited, and in which the ignited charge is first partially expanded in the closed combustion chamber and, thereafter, continues expansion in a chamber formed by the combustion chamber groove in the secondary rotor and a communicating groove in the primary rotor until the exhaust phase of the cycle is reached. The cycle of operation of this form of engine does not provide, inherently through the action of the intermeshing rotors alone, separate induction and exhaust phases.

In accordance with the principles of the invention this lack of separate induction and exhaust phases in the cycle is remedied by the provision of special means, preferably external means, hereinafter to be more fully described, for effecting the induction of the combustion supporting or combustible mixture charge of elastic fluid (as the case may be) for subsequent compression in the compression phase of the cycle.

Obviously, within the broad purview of the invention, many different specific embodiments of apparatus are possible, for effecting cycles based upon the ignition, either electrically or by a thermal device, of combustible fuel air mixtures externally carburated before induction into the engine, or formed by injection of liquid fuel into air, either before or after the induction of the latter into the engine, to form a combustible mixture for subsequent ignition, or for effecting cycles based upon injection of liquid fuel into a charge of air inducted into and precompressed to ignition temperature within the engine before such injection.

Figure 2:
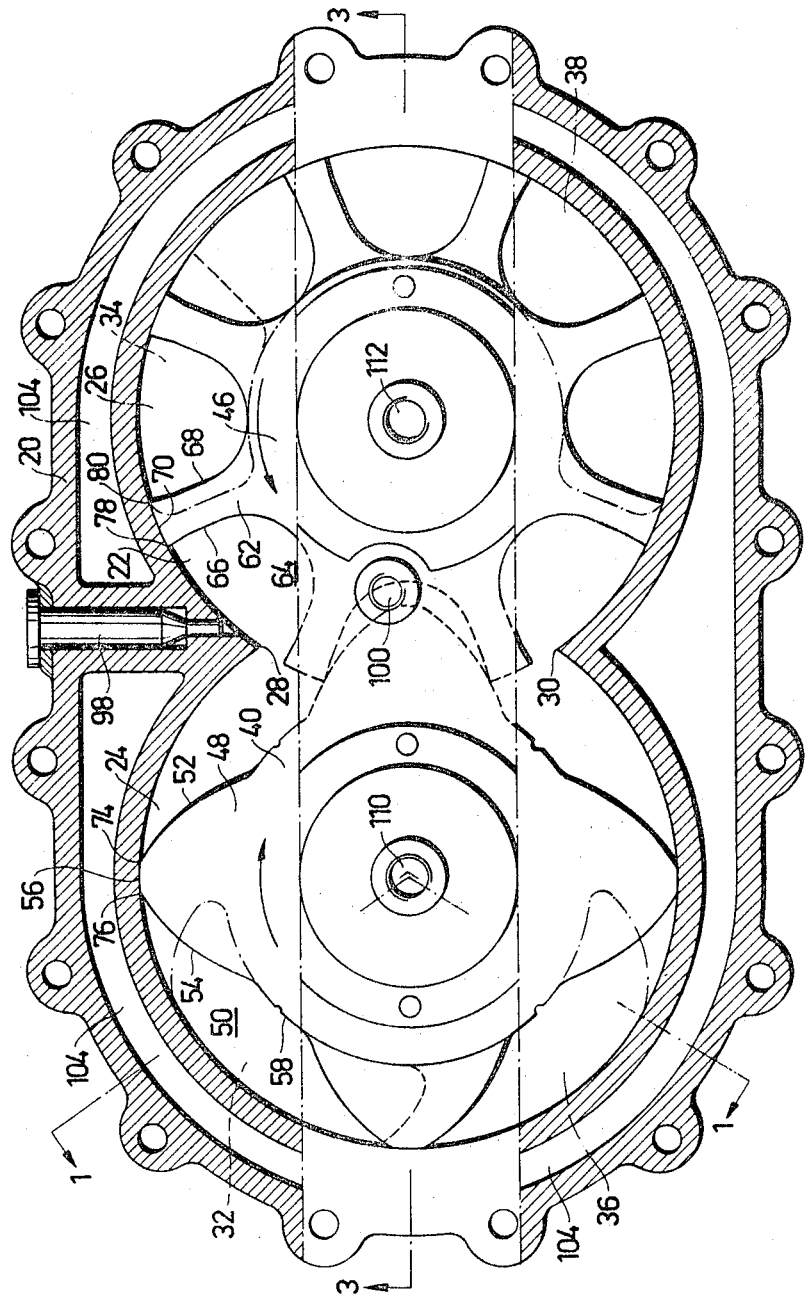
Figure 3:
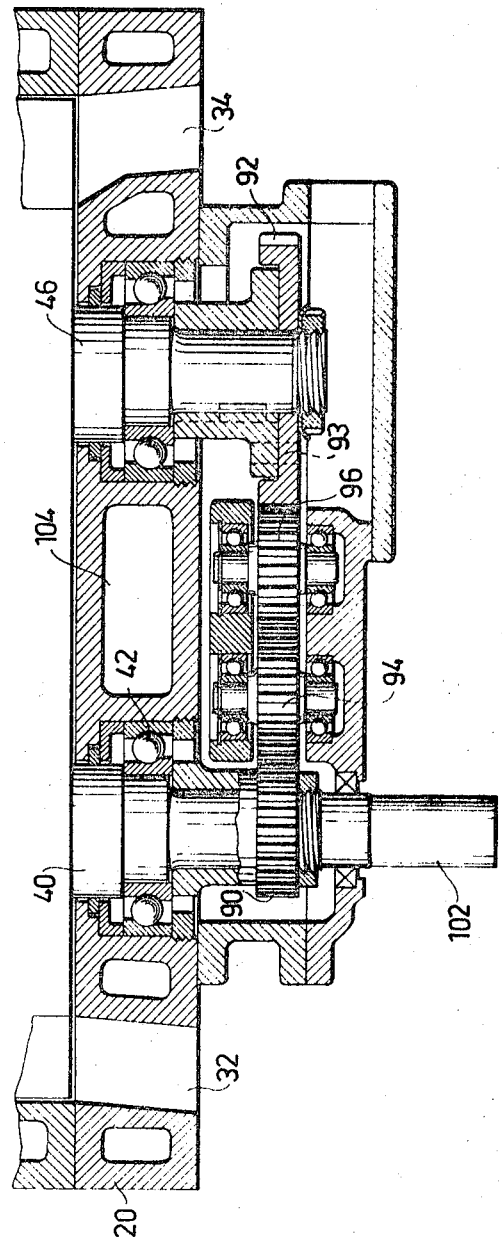
Figure 4:
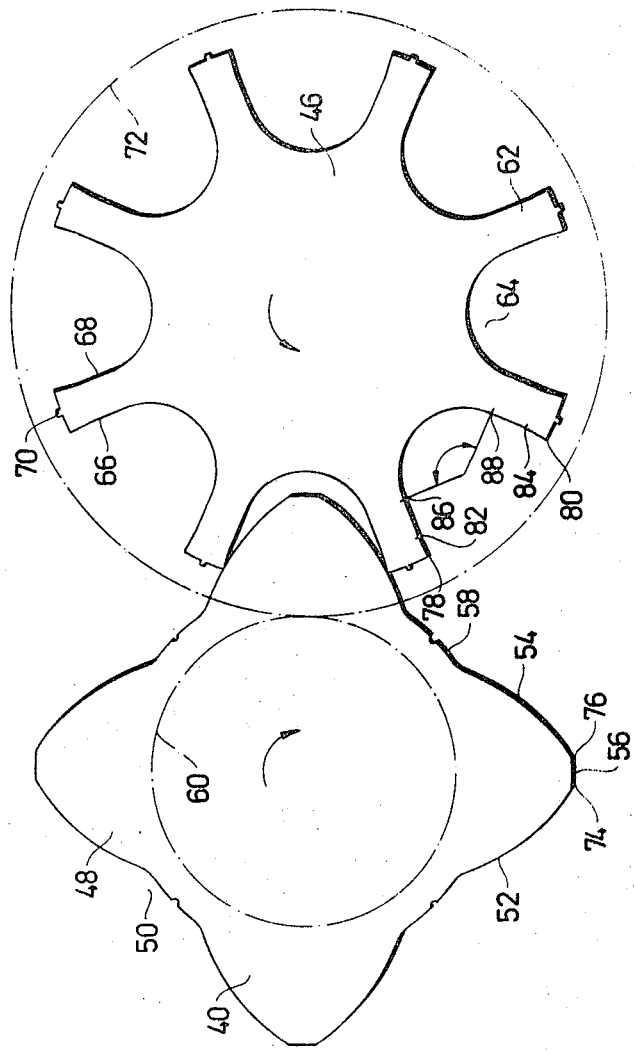
Figure 5:
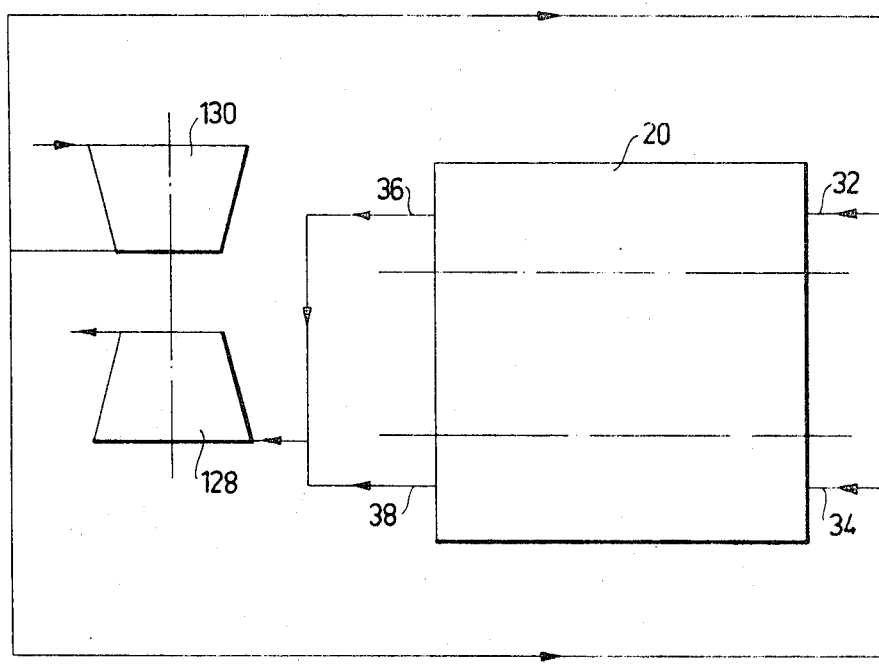
Figure 6:
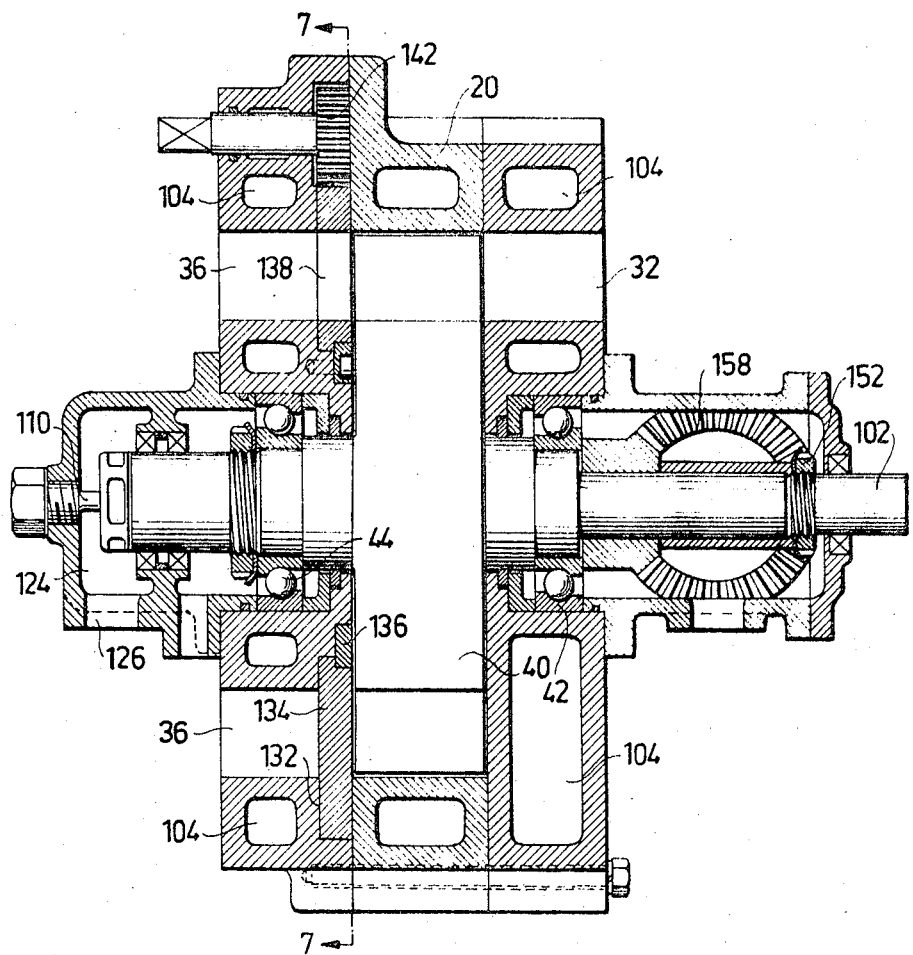
Figure 7:
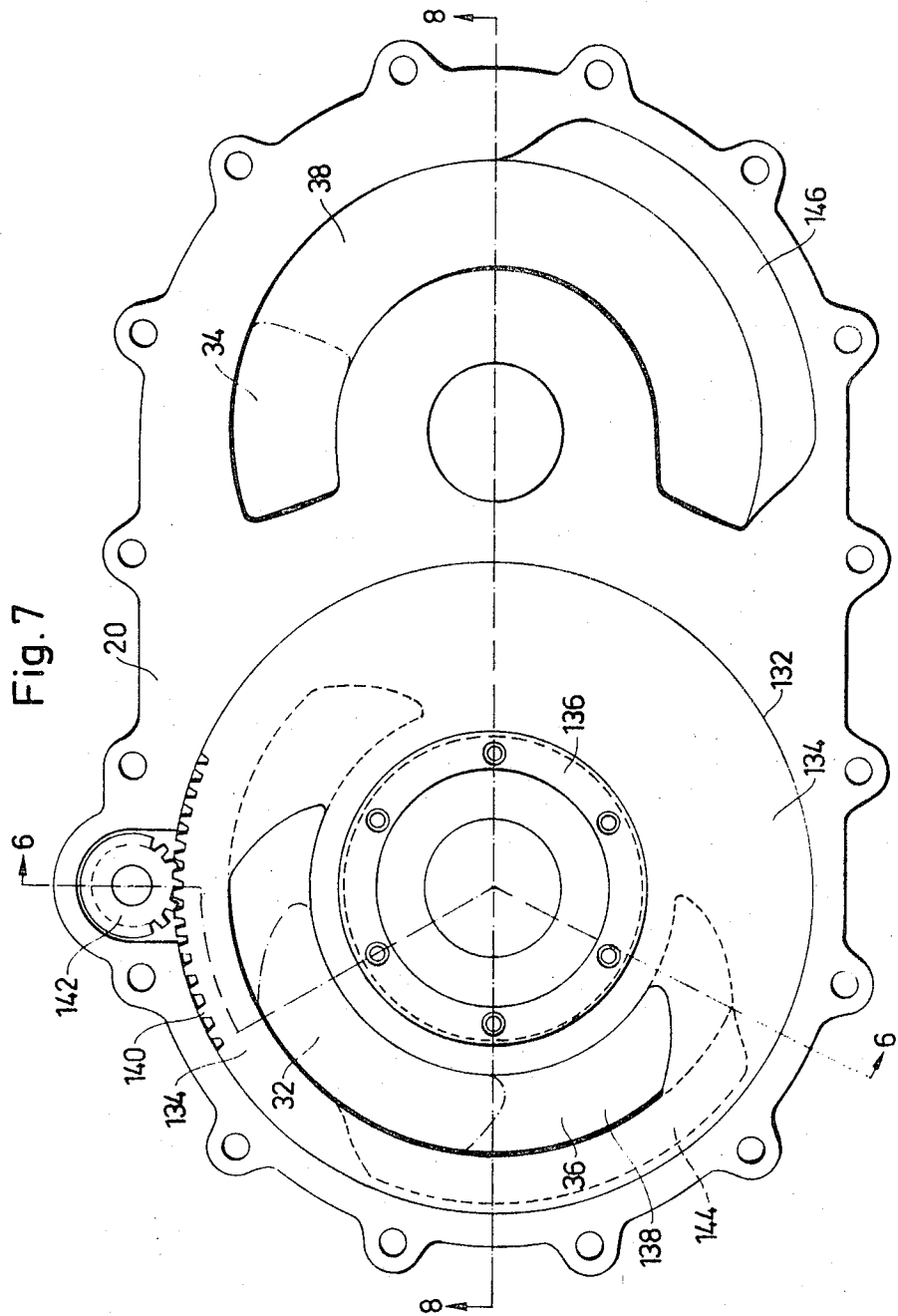
Figure 8:
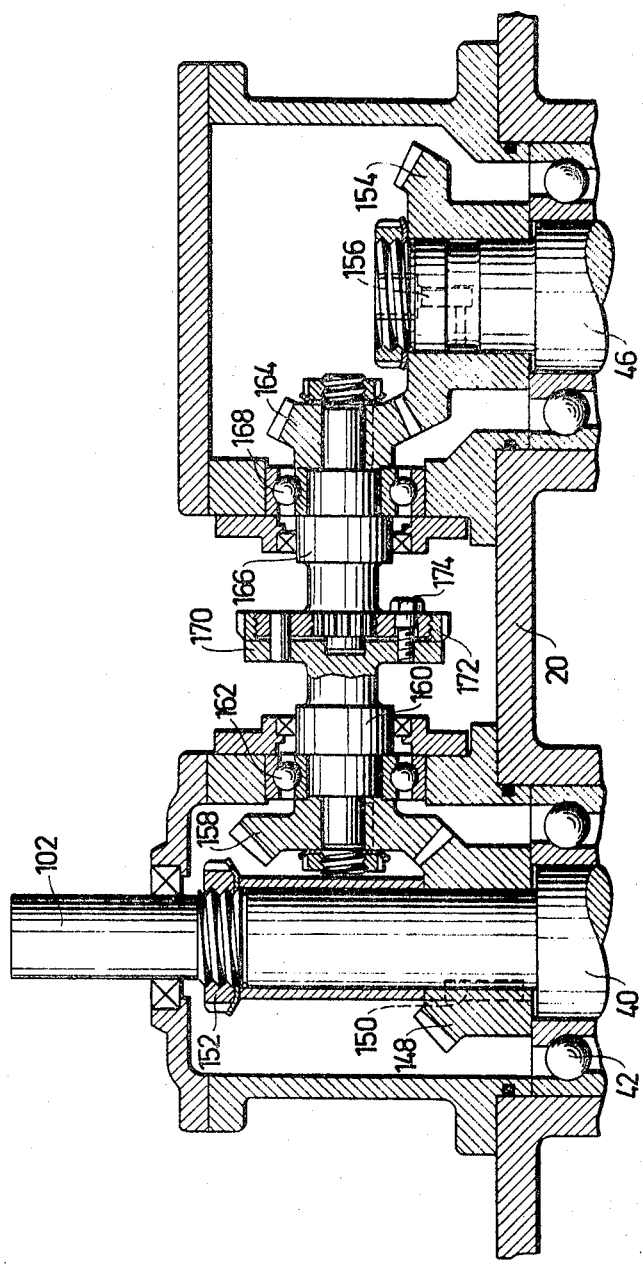
Figure 9:
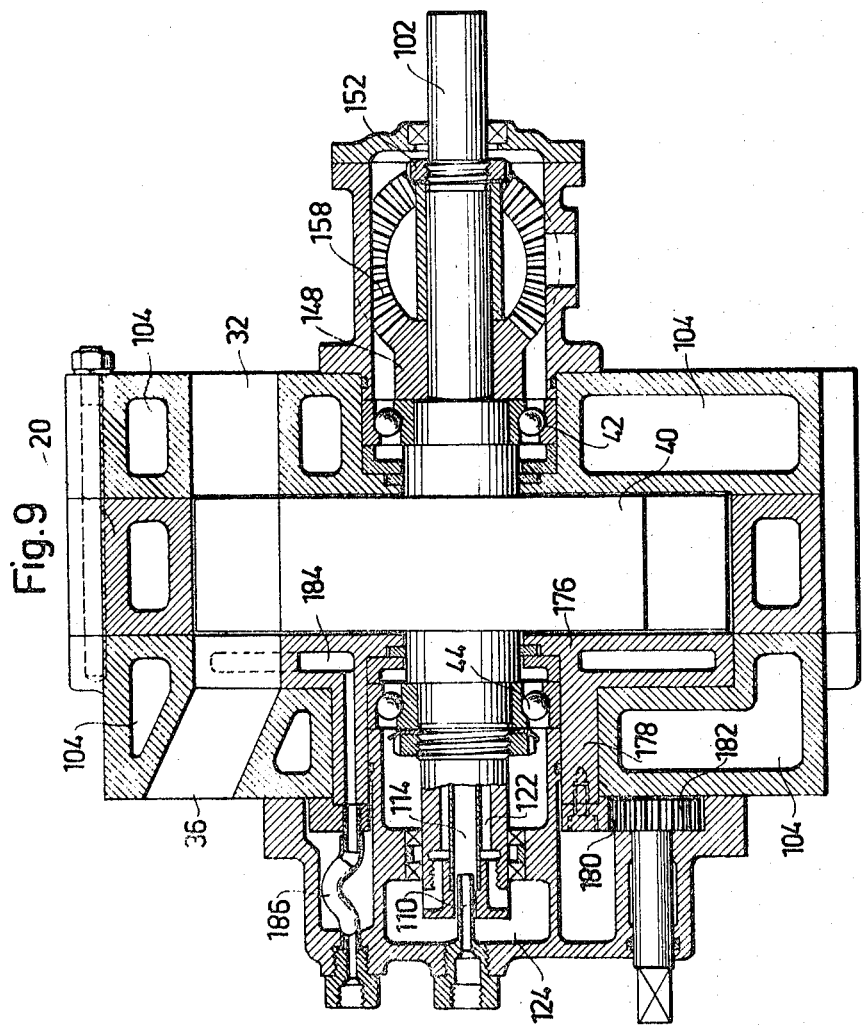
Figure 10:
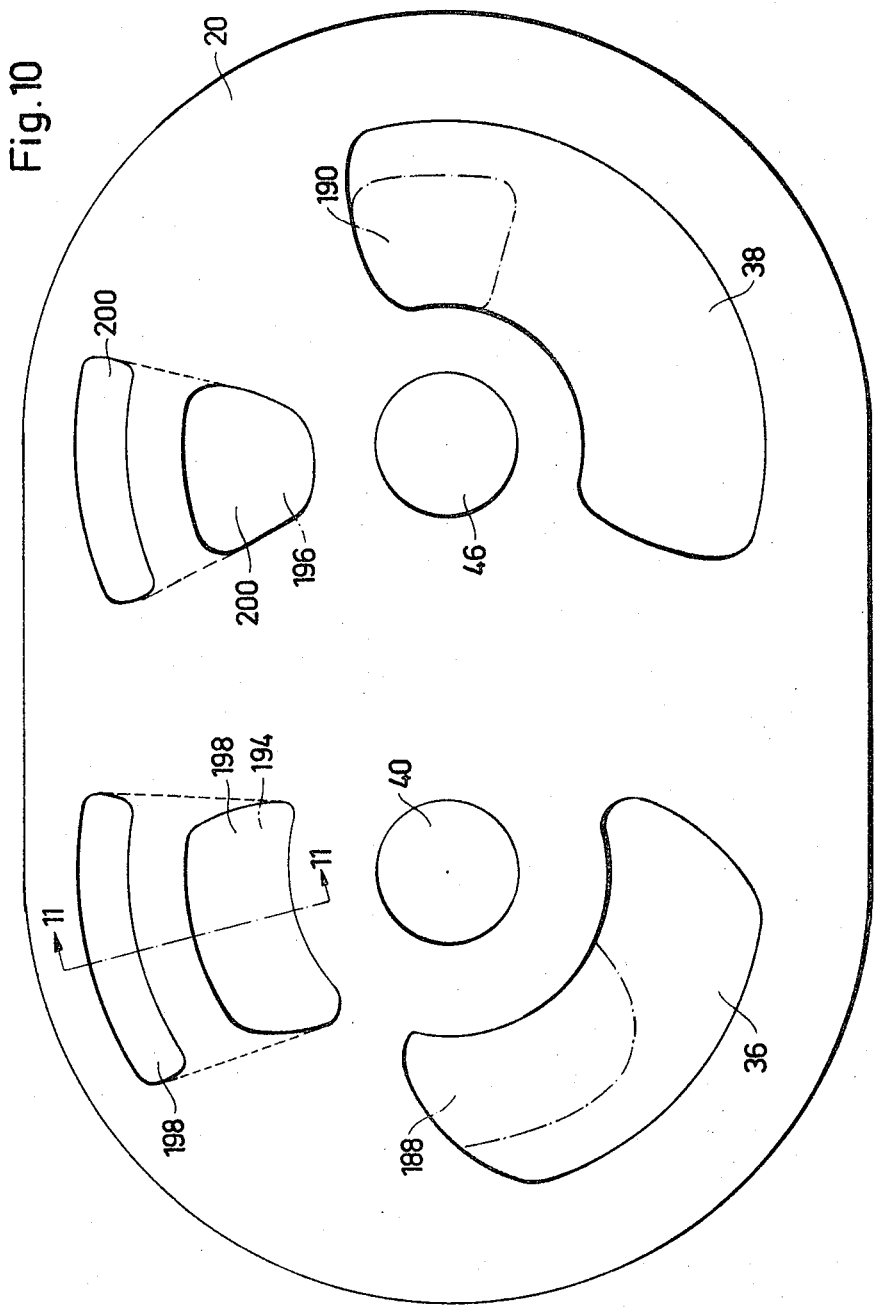
Figure 11:
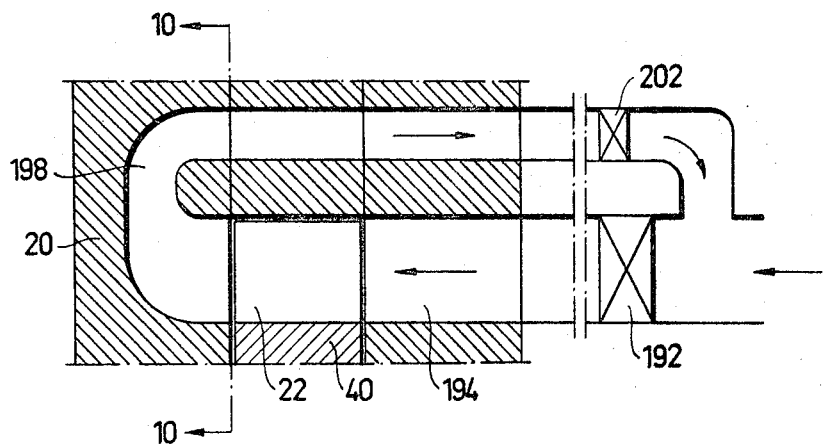

Several embodiments of an engine in accordance with this invention will now be described by way of example with the accompanying drawings in which:

FIG. 1 is a longitudinal section of an engine embodying the invention taken along line 1—1 in FIG. 2, FIG. 2 is a section taken along line 2—2 in FIG. 1, FIG. 3 is a fragmentary section taken along line 3—3 in FIG. 2, FIG. 4 is a cross-section of the rotors of the engine, FIG. 5 is a diagram showing the flow of the working fluid outside the working space of the engine, FIG. 6 is a longitudinal section of a second embodiment of the invention taken along line 6—6 in FIG. 7, FIG. 7 is a section taken along line 7—7 in FIG. 6, FIG. 8 is a fragmentary section taken along line 8—8 in FIG. 7, FIG. 9 is a longitudinal section of a third embodiment of the invention, FIG. 10 is a cross-section, corresponding to FIG. 7, of a fourth embodiment of the invention taken along line 10—10 in FIG. 11 and FIG. 11 is a fragmentary section taken along line 11—11 in FIG. 10.

The engine shown in FIGURES 1, 2, 3, 4 and 5 comprises a casing 20 enclosing a working space 22 consisting of two cylindrical bores 24, 26 having parallel axes and intersecting along two straight axially extending lines 28, 30. The casing 20 has two separate axial inlet channels 32, 34, one communicating with each bore 24, 26 and two outlet channels 36, 38, one communicating with each bore 24, 26. Fresh air for scavenging and charging the engine is supplied through both inlet channels and exhaust gas is removed from the engine through said outlet channels. A primary rotor 40 is carried in bearings 42, 44 so as to be coaxially mounted in the bore 24 which communicates with the channels 32 and 36. A secondary rotor 46 is, in the same way, coaxially mounted in the bore 26 which communicates with the channels 34 and 38.

The primary rotor 40 has four straight lands 48 with intervening grooves 50. Each land 48 has two axially extending flanks 52, 54 and an intermediate crest 56. Each groove 50 has a valley 58 located radially outside the pitch circle 60 (FIGURE 4) of the rotor. The crests 56 of the lands 48 and the valleys 58 of the grooves 50 lie on cylinders of circular cross-section which are coaxial with the rotor 40. The secondary rotor 46 has eight straight lands 62 with intervening grooves 64. Each land 62 has two axially extending flanks 66, 68 and an intermediate crest 70 located radially inside the pitch circle 72 (see FIGURE 4) of the rotor whereas the flanks 66, 68 of two consecutive lands 62 merge into each other to form the valley of the intervening groove 64. The crest 70 of the lands 62 lie on a cylinder of circular cross-section which is coaxial with the rotor 46.

We shall now consider the profile of the flanks of the primary and secondary rotors taken in the plane of FIGURE 4, that is, in a plane normal to the axes of the rotors. Moving radially inwardly from the outermost points 74, 76 to the valley 58 of the adjacent groove 50, each flank 52, 54 of the primary rotor follows an epicycloidal curve generated by the outermost point 80, 78 of the mating flank 68, 66 of the secondary rotor 46. Similarly, moving radially inwardly from the outermost points 78, 80 each flank 66, 68 of a land 62 of the secondary rotor 46 includes an outer curved portion extending to a point 82, 84 and following an epicycloidal curve generated by the outermost point 76, 74 of the mating flank 54, 52 of the primary rotor 40; and intermediate straight portion extending from the point 82, 84 to a point 86, 88 and following a straight line parallel with a radius from the centre of the rotor 46 drawn centrally through the land 62 which straight line forms a tangent to the outer curved portion 78, 82; 80, 84; at the point 82, 84 and an inner curved portion extending inwardly from the point 86, 88 and following a circular arc extending through an angle of 67.5° and having its centre on a radius from the centre of the rotor 46 drawn centrally through the adjacent groove 64 and located at such a point that the straight line 82, 86; 84, 88 forms a tangent to the inner curved portion at the point 86, 88. It will, therefore, be appreciated that the portion of a secondary rotor groove between the points 86 and 88 is a circular arc extending through an angle of 135°.

In order to improve the sealing it is preferable that positive seals are provided in the crest edges of the flanks of the rotor lands defined by the points 74, 76, 78, 80 for sliding contact with the cooperating flank portion of the other rotor. For the same reason it is preferable that similar positive seals are provided for sealing of the clearances between the ends of the rotors 40, 46 and the end walls of the working space 22.

The inlet and outlet channels 32, 34, 36, 38 in the casing 20 communicate with the working space 22 through ports having a radial extent corresponding to that of the grooves 50, 64 of the cooperating rotor. Each port is limited in the peripheral direction by edges having shapes substantially corresponding to those of the cooperating rotor flanks 52, 54, 66, 68. The edges of the ports of the outlet channels 36, 38 are located in such angular positions with regard to the intersection lines 28, 30 between the bores 24, 26 that the area of the end wall of the working space remaining between the edge and the corresponding intersection line corresponds to the cross-section area of a groove 50, 64 in the cooperating rotor 40, 46. The edges of the ports of the inlet channels 32, 34 are located in such angular positions that those disposed adjacent to the intersection line 28 and thus determining the inlet chambers, register with the corresponding edges of the outlet channel ports, whereas the edges disposed adjacent to the intersection line 30 and thus determining the beginning of the scavenging phase are angularly spaced from the corresponding edges of the outlet channel ports to such an extent that flow of the exhaust gas from the corresponding rotor groove owing to overpressure of the exhaust gas has finished before the beginning of scavenging.

As shown in FIGURE 3, the two rotors 40, 46 are fitted with synchronizing gears 90, 92 which are located outside the working space 22 and the pitch circles of these synchronizing gears have radii corresponding to a certain fraction of the radii of the pitch circles 60, 72 of the corresponding rotors 40, 46. In the engine shown in FIGURES 1–5, the maximum diameters of the gears 90, 92 are no greater than the root circle of the corresponding rotor. The two gears 90, 92 constitute the first and fourth gears in a four gear train mounted in the casing 20. The second and third gears of the gear train are designated 94, 96 and these gears maintain the two rotors 40, 46 in a required angular relationship in order to avoid direct mechanical contact therebetween. In FIGURE 3, the gear 90 is non-rotatably keyed to the primary rotor 40 whereas the gear 92 may be adjusted relatively to the secondary rotor 46 and in any desired position using a pin indicated at 93. Of course, the gear 92 may key to the shaft of the rotor 46 and adjustment effected using a pin such as 93 between the gear 90 and the shaft of the primary rotor 40.

An injection nozzle 98 (see FIGURE 2) for supplying fuel in the form of a combustible liquid obtained from a pressure liquid source, not shown, into the working space 22 is located in the casing 20 in such a place that the liquid is injected into a groove 64 of the secondary rotor 46 after that said groove 64 has been moved out of communication with the corresponding inlet channel 34 and before the mating land 48 of the primary rotor 40 enters said groove 64.

Means, in the form of a spark plug 100, for igniting the combustible fuel mixture is provided in at least one end wall of the casing 20 and is located within an area of the end wall where the free space of the groove 64 of the secondary rotor 46, taken in a plane transverse to the axes of the rotors, is limited only by the flanks 68, 66 thereof and by the flanks 52, 54 of the mating land 48 of the primary rotor 40. Preferably, the spark plug 100 is located in an area of the end wall limited by the flanks 68, 66; 54, 52 when the appropriate intermeshing groove and lands are either in or are close to their maximum intermesh position.

The primary rotor 40 also has an external stub shaft 102 for transmission of power to and from the engine.

The casing 20 (see FIGURES 1 and 2) is formed with internal channels 104 for circulation therethrough of a cooling fluid, such as water, which is supplied through an inlet opening 106 and carried off through an outlet opening 108.

Each rotor 40, 46 also has an internal cooling system (see FIGURES 1 and 2). An injection nozzle 110, 112 is mounted in the casing 20 coaxially with the shaft of each rotor 40, 46 and each nozzle 110, 112 communicates with the internal cooling system of the corresponding rotor. In the primary rotor 40 the cooling fluid, preferably a liquid and especially a lubricating oil, is injected through the nozzle 110 into a pipe 114 centrally mounted within the rotor 40. The pipe 114 communicates with a first space 116 located centrally within the rotor and, in turn, the space 116 communicates with a second space 118 within the rotor through a number of channels 120, each located within a land 48 of the rotor 40 and provided to circulate the cooling fluid through the said land. The space 118 communicates with a chamber 124 formed in the casing 20 via a central channel 122 surrounding the pipe 114. The chamber 124 has an outlet 126 for leading cooling fluid away from the engine.

The outlet channels 36, 38 of the working space 22 communicate with a turbine 128 driven by the exhaust gases. The turbine 128 is connected with a blower 130 acting as a scavenging pump communicating with the inlet channels 32, 34 of the working space 22 (FIGURE 5).

This turbine-blower unit 128, 130 is shown only as an example and the scavenging means can be arranged in several other ways, for instance by a fan driven by the engine shaft 102 or by means of an exhaust gas actuated injector.

The operation of an engine as shown in FIGURES 1 to 5 will now be described. The rotors 40, 46 are, for starting purposes, rotated by external means, not shown. Air is supplied by the blower 130 through the inlet channels 32, 34 to the working space 22. During a restricted initial angular phase of rotation of the rotors 40, 46 a groove 50 of the primary rotor 40 and a corresponding groove 64 of the secondary rotor are filled with fresh air. During further rotation of the rotors 40, 46 the grooves 50, 64 are brought out of communication with their respective inlet channels 32, 34 and form two separate constituent inlet chambers, each comprising an unobstructed groove 50, 64 bounded by the walls of the working space 22 and completely filled with fresh air. In this position of the rotors, injection of fuel by the injection means 98 into the groove 64 of the secondary rotor 46 starts. As the rotors continue to revolve the edge 76 of the leading flank 54 of the groove 50 passes the intersection line 28 between the bores 24, 26 and, at the same time, the leading edge 78 of the leading land 62 of the groove 64 of the secondary rotor 46 passes the line of intersection 28 and goes into sealing proximity with the leading flank 54 of the groove 50 of the primary rotor 40 and the land 62 of the secondary rotor 46 starts to enter the groove 50 so that the free volume of the groove 50 is decreased and compression begins of the air enclosed therein. When the trailing edge 80 of the leading land 62 of the groove 64 of the secondary rotor 46 passes the line 28, the two grooves 50, 64 are brought into communication with each other and form a common compression chamber. However, owing to the fact that the peripheral extent of the crest 70 between the edges 78 and 80 of the land 62 of the secondary rotor is very limited, compression in the groove 50 of the primary rotor 40 by the land 62 prior to communication between the two grooves 50, 64 is very low and, consequently, the losses owing to re-expansion into the groove 64 are negligible. As the rotors 40, 46 continue to rotate the land 62 of the secondary rotor more and more decreases the free volume of the groove 50 of the primary rotor 40 as first the leading edge 78 of the land 62 follows the leading flank 54 of the groove 50, after which the crest 70 of the land 62 rolls and slides along the valley 58 of the groove 50. When the trailing flank 52 of the primary rotor starts to enter the groove 62 of the secondary rotor 46 the free volume of this groove also starts to decrease. When the edge 74 of the trailing flank 52 of the groove 50 of the primary rotor 40 passes the intersection line 28 all the free volume of the compression chamber is in the groove 64 of the secondary rotor 46. From the angular position of the rotors in which the trailing edge 76 of the crest 56 of the trailing land 48 of the groove 50 of the primary rotor as well as the edge 78 of the trailing flank 66 of the groove 64 of the secondary rotor 46 pass the intersection line 28, the compression chamber, considered in a plane transverse to the rotor axes, consists of a portion of the groove 64 of the secondary rotor 46, bounded only by the flanks 68, 66 of the groove 64 and of portions of the flanks 52, 54 of the land 48 of the primary rotor 40 entering said groove 64. The land 48 thus behaves as a piston entering the chamber composed of the groove 64. Thereafter, the volume of the chamber is further decreased until the rotors reach an angular position in which the land 48 is in its maximum intermesh position with the groove 64. In this position of maximum intermesh the edges 78, 76 of the flanks 68, 66 of the groove 64 cooperate with the flanks 52, 54 of the land 48 of the primary rotor 40 along lines which are radially equi-distant from the axis of the primary rotor 40. In all angular positions of the rotors from the position in which compression starts, as said above, to the position of maximum intermesh, the area of the flank 52 of the primary rotor facing the chamber under consideration, being the trailing flank of the groove 50 or the leading flank of the land 48, is larger than the area of the flank 54 facing the said chamber, being the leading flank of the groove 50 and the trailing flank of the land 48, respectively. During this portion of the rotation, the compression phase, the primary rotor transmits power to the gas enclosed in the chamber. During substantially the whole of the compression phase, the surfaces of the flanks 68, 66 of the groove 64 of the secondary rotor 46 face the chamber under consideration and, consequently, the secondary rotor is subjected to practically no torque during the compression phase.

Owing to the limited speed of flame propagation in the air fuel mixture, the mixture is ignited by the spark plug 100 in an angular position of the rotors somewhat before that of maximum intermesh of the rotors.

After passage of the angular position of the rotors 40, 46 corresponding to maximum intermesh between the land 48 of the primary rotor 40 and the groove 64 of the secondary rotor 46 in which the chamber comprising the free space of the groove 64 has its minimum volume, the chamber once more increases in volume and the gas enclosed therein is expanded. This expansion chamber taken in a plane transverse to the axes of the rotors, is bounded only by the flanks 68, 66 of the groove 64 of the secondary rotor 46 and by portions of the flanks 52, 54 of the land 48 of the primary rotor 40 projecting therein up to the angular position of the rotors in which the edge 80 of the leading flank 68 of the groove 64 and the edge 74 of the leading flank 52 of the land 48 pass the intersection line 30 between the bores 24, 26 of the working space 22. During the rotation of the rotors first the edge 78 of the trailing flank 66 of the groove 64 follows the trailing flank 54 of the land 48, then the crest 70 of the trailing land of the groove 64 rolls and slides along the valley 58 of the trailing groove 50 of the land 48, and finally the trailing edge 80 of the crest 70 of the trailing land 62 of the groove 64 follows the trailing flank 52 of the trailing groove 50 of the land 48. When the edge 78 of the trailing flank 66 of the groove 64 passes the intersection line 30 the communication between the groove 64 of the secondary rotor 46 and the groove 50 of the primary rotor 40 is cut off and the expansion of the gas enclosed in the groove 46 is completed and the groove 46 forms a first outlet chamber. The expansion of the gas enclosed in the groove 50, however, continues until the angular position of the rotors in which the trailing edge 80 of the crest 70 of the trailing land 62 of the groove 64 and the edge 74 of the trailing flank 52 of the groove 50 passes the intersection line 30 and the groove 50 forms a second outlet chamber. In all angular positions of the rotors from the position of maximum intermesh to the position in which the expansion is completed the area of the flank 54 of the primary rotor facing the chamber under consideration, being the trailing flank of the land 48 or the leading flank of the groove 50, is larger than the area of the flank 52 facing said chamber, being the leading flank of the land 48 and the trailing flank of the groove 50, respectively. During this portion of the rotation, the expansion phase, the primary rotor thus absorbs power from the gas enclosed in the chamber. During susbtantially the whole of the expansion phase, the surfaces of the flanks 68, 66 of the groove 64 of the secondary rotor 46 face the chamber under consideration and, consequently, the secondary rotor is subjected to practically no torque during the expansion phase.

Upon completion of the expansion phase, the outlet chambers formed by the grooves 50 and 64 are brought into communication with the outlet channels 36 and 38, respectively, and the exhaust gas of the engine which gas has a pressure considerably above the atmospheric pressure is passed to the exhaust gas driven turbine 128 and then to the atmosphere. The turbine 128 drives the blower 130 which delivers slightly compressed air to the inlet channeils 32, 34 from which it is passed into the grooves 50, 64 of the rotors 40, 46 for scavenging and filling thereof. The cycle of the engine is then repeated.

Since the pressure in the chamber (which constitutes the compression, combustion and expansion chamber as said above) increases very considerably during the combustion phase, the pressure in the chamber at a certain chamber volume is higher during the expansion phase than during the compression phase for the same chamber volume, the power absorbed by the primary rotor 40 from the gas during the expansion phase is larger than the power transmitted from the rotor 40 to the gas during the compression phase. As mentioned above, the secondary rotor 46 is subjected to practically no torque both during compression and expansion phases, and as a result, the primary rotor is continuously subjected to a positive torque whereas practically no torque is transmitted through the synchronizing gears.

The engine shown in FIGURES 6, 7 and 8 differs from the engine shown in FIGURES 1 to 5 and these differences will now be considered. The engine of FIGURES 6, 7 and 8 includes in the casing 20 means for adjusting the angular position of the primary rotor 40 at which the cut-off from the outlet channel 36 occurs. The shape of the outlet channel 36 within the casing 20 is changed. The shape of the synchronizing means for the rotors is also changed.

The end wall of the casing 20 including the outlet channel 36, 38 has a groove 132 extending annularly around the axis of the primary rotor 40. In this groove 132 an angularly adjustable valve member 134 is axially retained in the casing 20 by a ring member 136. The valve member 134 has a port 138 corresponding to the axial opening of the outlet channel 36. In addition the valve member 134 has peripheral teeth 140 cooperating with an angularly adjustable gear 142 mounted in the casing and facilitating angular adjustment of the valve member 134. The casing 20 also has a radially relieved portion 144 in that barrel wall enclosing the primary rotor 40. The relieved portion 144 has an angular extent corresponding to a portion of the angular extent of the axial opening of the outlet channel 36 and is located at the end thereof which first communicates with the groove 50 enclosing the expanded exhaust gas. A corresponding radially relieved portion 146 is formed in that barrel wall of the casing 20 enclosing the secondary rotor 46.

In the engine of FIGURES 6, 7 and 8 the primary rotor 40 has a synchronizing gear 148 of the bevel type mounted on the shaft 102 of the rotor by a key 150 and a nut 152. The secondary rotor 46 has also a synchronizing gear 154 of bevel type which is in interference fit on the shaft of the rotor. The interference fit of the bevel gear 154 can be nullified by pressure liquid supplied through a channel 156 in the shaft in order to permit angular adjustment of the gear 154 relative to the rotor 46 for adjusting the synchronization of the rotors 40, 46. The bevel gear 148 of the primary rotor 40 cooperates with a first intermediate bevel gear 158 non-rotatably mounted on a first shaft 160 which is rotatably mounted in the casing 20 in a bearing 162. The bevel gear 154 of the secondary rotor 46 cooperates with a second intermediate gear 164 mounted on a second shaft 166 coaxial with the first shaft 156 and rotatably mounted in the casing 20 in a bearing 168. The two shafts 160, 166 are non-rotatably and axially adjustably connected by a coupling 170 comprising a nut 172 turnable on the shaft 166 and abutting against the shaft 160 in order to adjust the length of the combined shaft 160, 166 and further comprising at least one bolt 174 for locking the nut 172 in position.

The engine shown in FIGURES 6 to 8 acts substantially in the same way as the engine shown in FIGURES 1 to 5. However, by adjusting the valve member 134 the groove 50 of the primary rotor 40 may, after it has been brought out of communication with the inlet channel 32, still be brought into communication with the outlet channel 36 so that the air enclosed in the groove during a portion of the rotation of the rotors, instead of being compressed, without any noticeable compression thereof may flow out into the outlet channel 36 so that the power output of the engine can be reduced without introducing any losses corresponding to the throttling losses obtained in a conventional reciprocating engine. The radially relieved portions 144, 146 in the casing 20 improve the flow of the exhaust gases out of the grooves 50, 64 since the centrifugal forces acting on the exhaust gases are now utilized to assist the flow. The modified synchronizing bevel-gear train 148, 158, 164, 154 has the advantage over the spur synchronizing gear train 90, 94, 96, 92 shown in FIGURES 1 and 3 in that the points of intermesh between the gears of the trains are reduced from three to two thereby resulting in improved accuracy of the synchronization of the rotors 40, 46.

The engine shown in FIGURE 9 differs from that shown in FIGURES 6 to 8 with regard to the design of the angularly adjustable valve member. The engine shown in FIGURE 9 has an angularly adjustable valve member 176 formed with a coaxial tubular shaft 178 in which the outer race of the bearing 44 of the primary rotor 40 is located. An annular gear is bolted to the end of the tubular shaft 178 remote from the valve member 176. The gear 180 cooperates with a gear 182 thereby permitting angular adjustment of the valve member 176. The valve member 176 has an internal cooling channel 184 for a cooling fluid, such as water, and the cooling channel 184 communicates with an external cooler via a flexible inlet tube 186 and a corresponding flexible outlet tube.

The engine fragmentarily shown in FIGURES 10 and 11 is substantially of the same type as described with reference to FIGURES 1 to 9. However, instead of using fuel injection into the working space, the engine is adapted for a fuel supply using a carburetor. For this reason the engine of FIGURES 10 and 11 includes separate inlet channels for scavenging air and for air/fuel mixture. The inlet channels 188, 190 for the scavenging air communicate with the outlet channels 36, 38 for the exhaust gases. The combustion air is supplied through a carburetor 192 from which the air/fuel mixture is admitted to the working space 22 through axial inlet channels 194, 196. The inlet channels 194, 196 register with circulation channels 198, 200 in the opposite end wall of the working space 22. A fan 202 in the circulation channels 198, 200 serves to circulate the scavenging air enclosed in the grooves of the rotors to the carburetor 192. In order to get the necessary angular space for the different channels 188, 36, 194, 198; 190, 38, 196, 200 the porting of the engine is designed for cooperation with a primary rotor having eight grooves and a secondary rotor having twelve grooves. The lower limit for the number of the grooves in the rotors is, however, not higher than four even though in order to get sufficient area for each port the preferred number is higher.

The engine shown in FIGURES 10 and 11 acts substantially in the same way as those shown in FIGURES 1 to 9. After scavenging of the grooves, however, the air enclosed in the grooves is not compressed but forced out thereof by means of the fan 202 and replaced by a combustible air/fuel mixture supplied from the carburetor 192. The air fuel mixture is compressed, ignited, expanded and scavenged in the way explained above but no fuel is injected during compression.

An engine of the type shown in FIGURES 10 and 11 can of course be provided with an adjusting valve of the type shown in FIGURES 6 and 9 in order to adjust the engine during operation. For the sake of simplicity, however, no such valve is shown.

The invention is not limited to the shown embodiments but comprises everything falling within the scope of the following claims.

What is claimed is:

1. A rotary internal combustion engine comprising a support member provided with two intersecting barrel surfaces, each in a transverse plane following a circular arc having its center in one of two spaced coplanar axes, and a pair of intermeshing members of dissimilar profile mounted for rotation in relation to said support member about said coplanar axes and sealingly cooperating with each other and with said support member, each of said intermeshing members having a main body and at least three longitudinally extending lands with intervening grooves, one of said intermeshing members constituting a primary member having at least the substantial portion of each of its lands disposed on that side of the pitch circle remote from said main body of the member, the other intermeshing member constituting a secondary member having at least the substantial portion of each of its lands disposed on that side of the pitch circle towards said main body of the member, at least one of said members being provided with end walls, said walls and said barrel surfaces forming margins of a working space, and means for supplying constituents of a combustible mixture to said working space and means for exhausting combusted remains of the combustible mixture from said working space, wherein the profiles of the lands and grooves of the intermeshing members are shaped to provide within said working space, periodically and sequentially, while the members rotate relative to each other, two separate sealed inlet chambers, one of said chambers defined by the flanks of a groove in the primary member, the other of said chambers defined by the flanks of a groove in the secondary member, and each of said chambers being further defined by the confronting portions of said end walls and of the respective barrel surface, which inlet chambers are subsequently brought together to form a single and sealed operation chamber which continuously diminishes in volume through a first phase when said barrel surfaces form a margin of the chamber and through a second phase when the trailing lands of said inlet chamber grooves sealingly cooperate until said trailing land of the primary member moves into fully meshed position in said groove of the secondary member, to form a compressed combustible mixture to be ignited after the beginning of said second phase and substantially at the end thereof, and thereafter the sealed operation chamber continuously increases in volume, to provide an expansion of the combusted remains, until at maximum volume the operation chamber diverges into two separate outlet chambers, each defined by the flanks of a groove in one of said intermeshing members and by the confronting portions of said end walls and of the respective barrel surface.

2. A rotary internal combustion engine comprising a stationary support member constituting a housing structure enclosing a working space generally composed of two intersecting bores with parallel axes and providing two barrel surfaces, and a pair of intermeshing members of dissimilar profile located in said working space, mounted on said support member for rotation about said coplanar axes and sealingly cooperating with each other and with said support member, each of said intermeshing members having a main body and at least three longitudinally extending, external lands with intervening grooves, one of said intermeshing members constituting a primary rotor having its lands disposed outside the pitch circle of the rotor, the other intermeshing member constituting a secondary rotor having its lands disposed inside the pitch circle of the rotor, at least one of said members being provided with end walls forming margins of said working space, and further comprising means for supply of constituents of a combustible mixture to said working space, means for igniting said combustible mixture, and means for exhausting remains of the combustible mixture from said working space, in which the outer diameter of said secondary rotor is substantially greater than the diameter of said main body of the primary rotor and the profiles of the said lands and grooves of the rotors are shaped to provide within said working space, periodically and sequentially, while the rotors rotate, two separate sealed inlet chambers, one of said chambers defined by the flanks of a groove in the primary rotor, and the other of said chambers defined by the flanks of a groove in the secondary rotor, and each of said chambers being further defined by the confronting portions of said end walls and of the respective barrel surface, which inlet chambers are subsequently brought together to form a single and sealed operation chamber which continuously diminishes in volume through a first phase when said barrel surfaces form a margin of the chamber and through a second phase when the trailing lands of said inlet chamber grooves sealingly cooperate until said trailing land of the primary rotor moves into fully meshed position in said grove of the secondary rotor, to form a compressed combustible mixture to be ignited by said igniting means after the beginning of said second phase and substantially at the end thereof, and thereafter the sealed operation chamber continuously increases in volume, to provide an expansion of the combustion mixture, until at maximum volume the operation chamber diverges into the two separate outlet chambers, each defined by the flanks of a groove in one of said rotors and by the confronting portions of said end walls and of the respective barrel surface.

3. An engine as defined in claim 2 in which said means for supply and for exhausing comprises ports in the housing for entrance of elastic fluid to and for escape of elastic fluid from the rotor grooves, respectively, when said grooves pass from the position defining said outlet chambers to the position defining said inlet chambers, and means for forcing elastic fluid through the appropriate ports in the housing to scavenge and charge said grooves.

4. An engine as defined in claim 3, in which said end walls of the working space are completely located in said housing.

5. An engine as defined in claim 3, in which the profiles of the flanks of the lands of the primary rotor are curves generated by the radially outer portions of the lands of the secondary rotor.

6. An engine as defined in claim 5, in which the profiles of the lands of the primary rotor are epicycloidal curves generated by the crest points of the lands of the secondary rotor.

7. An engine as defined in claim 6, in which said crest points of a flank of the secondary rotor form a straight axial line.

8. An engine as defined in claim 3, in which the profiles of the flanks of the lands of the primary rotor are curves generated by portions of the flanks of the lands of the secondary rotor to provide sealing lines between the intermeshing portions of the rotors and in which the flanks of the grooves in the secondary rotor at least over an essential portion of said flanks are spaced radially inwardly of the curves representing the envelopes of the lands of the primary rotor as they pass into and out of mesh with said grooves, whereby to provide a common operation chamber between each cooperating land and groove throughout the passage of the land through meshing relation with the groove.

9. An engine as defined in claim 3, in which the number of lands and grooves of the secondary rotor is greater than the number of lands and grooves of the primary rotor.

10. An engine as defined in claim 9, in which the diameter of the secondary rotor is sufficiently smaller than that of the pitch circle of the rotor so that no portions of the profiles of the grooves corresponding to the envelopes generated by the passage of the lands of the primary rotor into and out of mesh with the secondary rotor are peripherally wider than at the circumference of the secondary rotor, whereby to minimize the peripheral width of the crests of the lands of the secondary rotor for any given combination of numbers of lands and grooves for a pair of cooperating rotors.

11. An engine as defined in claim 4, in which the portions of the end walls of said housing structure defining the ends of the different bores are separately ported by ports located to provide for axial flow of gaseous scavenging fluid at least through the grooves of said primary rotor.

12. An engine as defined in claim 11, in which a single set of ports is provided for each bore and air is supplied thereto for scavenging and charging said grooves.

13. An engine as defined in claim 12, in which means is provided for solid injection of fuel into the grooves of at least one of said rotors after the charging thereof.

14. An engine as defined in claim 13, in which the fuel is injected into the grooves of the secondary rotor.

15. An engine as defined in claim 11, in which means actuated by energy derived from the exhaust gas of the engine is provided to supply said scavenging fluid.

16. An engine as defined in claim 15, in which said means comprises an exhaust gas driven blower.

17. An engine as defined in claim 15, in which said means comprises an exhaust gas actuated injector.

18. An engine as defined in claim 11, in which the portions of the end walls of at least one of said bores are provided with two sets of peripherally spaced ports for separate flow of scavenging and charging fluids through said grooves.

19. An engine as defined in claim 18, in which the two sets of ports are peripherally spaced to register separately in sequence with the rotor grooves.

20. An engine as defined in claim 19, in which means is provided for supplying scavenging air to the set of ports with which the grooves first register and for supplying a combustible gaseous mixture to the set of ports with which the grooves last register.

21. An engine as defined in claim 4, in which the end walls of at least one of the bores of the housing structure are ported for supplying combustible gaseous charge to said inlet chambers.

22. An engine as defined in claim 20, in which means is provided for forcing said combustible mixture through the ports with which the grooves last register to displace the fluid previously contained in said grooves.

23. An engine as defined in claim 22, in which means is provided for recirculating the fluid displaced from said grooves by the incoming mixture to the supply conduit for said mixture.

24. An engine as defined in claim 23, in which both of the bores of the housing structure are ported to provide separate combustible charges to each of said inlet chambers.

25. An engine as defined in claim 4, in which movable valve means is interposed between said housing structure and the confronting end of at least one of said rotors for varying the timing of the closure of the port means in said housing structure to control the charging of said inlet chambers.

26. An engine as defined in claim 25, in which the ports are located in the end wall portions of the housing structure and said valve means comprises a plate type valve interposed between one end wall of the housing structure and the confronting end of one of said rotors, said valve having a control edge movable to vary the angular position of the effective closing edge of said port means.

27. An engine as defined in claim 25, in which said valve is of the rotary disc type mounted to turn about the axis of the rotor with which it cooperates.

28. An engine as defined in claim 27, in which the valve is at one end of and cooperated with the primary rotor.

29. An engine as defined in claim 28, in which the port means in the housing structure and the closing edge of the valve have a radial extent at least as great as that of the lands of the rotor.

30. An engine as defined in claim 29, in which the closing edges of said port means and said valve have the same profile and orientation as that of the leading flanks of the lands of the rotor.

31. An engine as defined in claim 28, in which a control gear carried by said housing structure engages the valve to adjust its angular position.

32. An engine as defined in claim 3, including timing gears for keeping the lands and grooves of the rotors in fixed synchronized relation.

33. An engine as defined in claim 32, in which the gearing comprises gears having a maximum diameter no greater than that of the root circle of the grooves of the corresponding rotor.

34. An engine as defined in claim 33, in which said shaft means includes means for angularly adjusting the positions of one rotor and a gear connected thereto.

35. An engine as defined in claim 34, in which the gearing comprises two pairs of bevel gears, one gear of each pair being connected to the shaft of a different rotor and shaft means connecting the remaining gears of the pairs.

36. An engine as defined in claim 35, in which said shaft means includes a driving connection permitting movement of the gear assemblies of said pairs of gears toward and away from each other.

37. An engine as defined in claim 33, in which said gearing comprises a gear train of spur gears.

References Cited

UNITED STATES PATENTS

| | | | |
|---|---|---|---|
| 1,240,112 | 9/1917 | Winger | 123—12 |
| 2,869,522 | 1/1959 | Marean | 123—12 |
| 3,182,900 | 5/1965 | Thorson | 230—141 |
| 3,297,006 | 1/1967 | Marshall | 123—13 |

FOREIGN PATENTS 1,031,991  6/1966  Great Britain.

C. J. HUSAR, Primary Examiner

U.S. Cl. X.R.

9—81; 103—126; 230—141

UNITED STATES PATENT OFFICE
CERTIFICATE OF CORRECTION

Patent No. 3,468,294      Dated September 23, 1969

Inventor(s) H. R. NILSSON

It is certified that error appears in the above-identified patent and that said Letters Patent are hereby corrected as shown below:

Column 4, line 35, cancel "78, 82; 80, 84;" and insert in its place --78, 82; 80, 84--; same column, same line, cancel "82, 84" and insert in its place --82, 84;--. Column 8, line 4, cancel "channeils" and insert in its place --channels--. Column 10, line 22, after "said" second occurrence insert --end--. Column 11, line 25, cancel "combustion" and insert in its place --combusted--.

SIGNED AND SEALED
MAY 26 1970

(SEAL)
Attest:

Edward M. Fletcher, Jr.
Attesting Officer

WILLIAM E. SCHUYLER, JR.
Commissioner of Patents